(12) United States Patent
Naji et al.

(10) Patent No.: US 7,396,402 B2
(45) Date of Patent: Jul. 8, 2008

(54) COATINGS FOR BUILDING PRODUCTS AND DEWATERING AID FOR USE WITH SAME

(75) Inventors: Basil Naji, Toongabbie (AU); Milton O'Chee, Sydney (AU)

(73) Assignee: James Hardie International Finance B.V. (NL)

( * ) Notice: Subject to any disclaimer, the term of this patent is extended or adjusted under 35 U.S.C. 154(b) by 0 days.

(21) Appl. No.: 10/090,299

(22) Filed: Mar. 4, 2002

(65) Prior Publication Data

US 2002/0175126 A1    Nov. 28, 2002

(30) Foreign Application Priority Data

| Mar. 2, 2001 | (AU) | ................................. PR3474 |
| Mar. 2, 2001 | (AU) | ................................. PR3475 |
| Mar. 2, 2001 | (AU) | ................................. PR3476 |
| Mar. 2, 2001 | (AU) | ................................. PR3477 |
| Mar. 2, 2001 | (AU) | ................................. PR3478 |

(51) Int. Cl.
*C04B 18/06* (2006.01)

(52) U.S. Cl. .................. 106/705; 106/DIG. 1

(58) Field of Classification Search ............ 106/DIG. 1, 106/705
See application file for complete search history.

(56) References Cited

U.S. PATENT DOCUMENTS

| 2,987,408 | A |   | 6/1961 | Minnick |
| 3,360,392 | A |   | 12/1967 | Mod et al. |
| 3,501,324 | A |   | 3/1970 | Kubo |
| 3,679,446 | A |   | 7/1972 | Kubo |
| 3,782,985 | A | * | 1/1974 | Gebhardt |
| 3,843,380 | A |   | 10/1974 | Beyn |
| 3,865,779 | A |   | 2/1975 | Oya et al. |
| 3,873,025 | A |   | 3/1975 | Qvarnstrom |
| 3,932,275 | A | * | 1/1976 | Mewes et al. ............... 210/712 |
| 4,052,220 | A |   | 10/1977 | Turpin, Jr. |
| 4,066,723 | A |   | 1/1978 | King et al. |
| 4,070,199 | A |   | 1/1978 | Downing et al. |
| 4,088,804 | A |   | 5/1978 | Cornwell et al. ............. 428/220 |
| 4,101,335 | A |   | 7/1978 | Barrable |
| 4,102,697 | A |   | 7/1978 | Fukuba et al. |
| 4,131,480 | A |   | 12/1978 | McCurrich et al. ............. 106/93 |
| 4,131,638 | A |   | 12/1978 | Whitaker et al. |
| 4,134,773 | A |   | 1/1979 | Simeonov et al. |
| 4,144,121 | A |   | 3/1979 | Otouma et al. |
| 4,188,231 | A |   | 2/1980 | Valore |
| 4,204,644 | A |   | 5/1980 | Kozuka |
| 4,240,840 | A |   | 12/1980 | Downing et al. |
| 4,250,134 | A |   | 2/1981 | Minnick |
| 4,256,504 | A |   | 3/1981 | Dunstan, Jr. ................. 106/109 |
| 4,256,584 | A |   | 3/1981 | Lord et al. |
| 4,261,286 | A |   | 4/1981 | Kupfer |
| 4,265,674 | A |   | 5/1981 | Debus et al. |
| 4,268,316 | A |   | 5/1981 | Wills, Jr. |
| 4,328,145 | A |   | 5/1982 | Bobrowski et al. |
| 4,339,289 | A |   | 7/1982 | Lankard |
| 4,344,804 | A |   | 8/1982 | Bijen et al. |
| 4,374,672 | A |   | 2/1983 | Funston et al. |
| 4,379,729 | A |   | 4/1983 | Cross |
| 4,383,960 | A |   | 5/1983 | Delcoigne et al. |
| 4,388,257 | A |   | 6/1983 | Oguri et al. |
| 4,394,175 | A |   | 7/1983 | Cheriton et al. |
| 4,403,006 | A |   | 9/1983 | Bruce et al. |
| 4,411,723 | A |   | 10/1983 | Takeuchi |
| 4,441,944 | A |   | 4/1984 | Massey |
| 4,478,736 | A | * | 10/1984 | Raba et al. ................... 252/180 |
| 4,495,301 | A |   | 1/1985 | Sutor |
| 4,507,154 | A |   | 3/1985 | Bürge et al. |
| 4,721,160 | A |   | 1/1988 | Parcevaux et al. |
| 4,746,364 | A |   | 5/1988 | Kawai et al. |
| 4,759,802 | A |   | 7/1988 | Ochi et al. |
| 4,767,491 | A |   | 8/1988 | Vittone et al. |
| 4,770,831 | A |   | 9/1988 | Walker |
| 4,772,328 | A |   | 9/1988 | Pfeifer |
| 4,775,505 | A |   | 10/1988 | Kuroda et al. |
| 4,816,091 | A |   | 3/1989 | Miller |
| 4,818,595 | A |   | 4/1989 | Ellis |
| 4,840,688 | A |   | 6/1989 | Vogt |
| 4,846,889 | A |   | 7/1989 | Meyer |
| 4,904,503 | A |   | 2/1990 | Hilton et al. |
| 4,915,740 | A |   | 4/1990 | Sakai et al. |

(Continued)

FOREIGN PATENT DOCUMENTS

AR    206788    8/1976

(Continued)

OTHER PUBLICATIONS

"New & Basic Research Approaches to liquid effluent treatment", Gehm, Paper Trade Journal (1958), 142 (No. 16), 40-4, 46.*

(Continued)

*Primary Examiner*—Paul Marcantoni
(74) *Attorney, Agent, or Firm*—Gardere Wynne Sewell LLP

(57) ABSTRACT

A dewatering aid for a slurry coating on a building product in which a coating formulation includes an hydraulic binder. A slurry is produced from said binder and dewatering aid and applied to the product to be coated. The resultant coating is then dewatered through said product. Dewatering can be accomplished with or without vacuum assistance.

19 Claims, No Drawings

U.S. PATENT DOCUMENTS

| | | | |
|---|---|---|---|
| 4,933,013 A * | 6/1990 | Sakai et al. ............... | 106/707 |
| 4,933,031 A | 6/1990 | Blomberg et al. | |
| 4,935,060 A | 6/1990 | Dingsoyr | |
| 4,946,505 A | 8/1990 | Jungk | |
| 4,981,740 A | 1/1991 | Larsen | |
| 4,994,113 A | 2/1991 | Helmstetter | |
| 5,032,548 A | 7/1991 | Lowe | |
| 5,047,086 A | 9/1991 | Hayakawa et al. | |
| 5,073,197 A | 12/1991 | Majumdar et al. | |
| 5,106,557 A | 4/1992 | Rirsch et al. | |
| 5,108,510 A | 4/1992 | Bürge et al. | |
| 5,108,679 A | 4/1992 | Rirsch et al. | |
| 5,154,771 A | 10/1992 | Wada et al. | |
| 5,174,821 A | 12/1992 | Matsuoka et al. | |
| 5,192,366 A | 3/1993 | Nishioka et al. | |
| 5,236,773 A | 8/1993 | Sorathia et al. | |
| 5,254,228 A | 10/1993 | Westhyof et al. | |
| 5,294,255 A | 3/1994 | Smetana et al. | |
| 5,314,119 A | 5/1994 | Watt | |
| 5,338,357 A | 8/1994 | Takai et al. | |
| 5,342,485 A * | 8/1994 | Armbrust, Jr. ............ | 162/181.5 |
| 5,346,012 A | 9/1994 | Heathman et al. | |
| 5,352,290 A | 10/1994 | Takeshita et al. | |
| 5,366,637 A * | 11/1994 | Turunc ............... | 210/728 |
| 5,383,521 A * | 1/1995 | Onan et al. ............... | 166/293 |
| 5,385,764 A | 1/1995 | Andersen et al. | |
| 5,387,283 A | 2/1995 | Kirkpatrick et al. | |
| 5,387,626 A | 2/1995 | Bohme-Kovac et al. | |
| 5,403,394 A | 4/1995 | Burgand | |
| 5,439,518 A | 8/1995 | Francis et al. | |
| 5,453,123 A | 9/1995 | Burge et al. | |
| 5,453,310 A | 9/1995 | Andersen et al. | |
| 5,470,383 A | 11/1995 | Schermann et al. | |
| 5,484,480 A | 1/1996 | Styron | |
| 5,490,889 A | 2/1996 | Kirkpatrick et al. | |
| 5,508,072 A | 4/1996 | Andersen et al. | |
| 5,536,310 A | 7/1996 | Brook et al. | |
| 5,547,505 A | 8/1996 | Nakatsu et al. | |
| 5,556,458 A | 9/1996 | Brook et al. | |
| 5,562,832 A * | 10/1996 | McOnie et al. ............ | 210/710 |
| 5,580,508 A | 12/1996 | Kobayashi et al. | |
| 5,583,079 A | 12/1996 | Golitz et al. | |
| 5,658,624 A | 8/1997 | Anderson et al. | |
| 5,681,384 A | 10/1997 | Liskowitz et al. | |
| 5,693,137 A | 12/1997 | Styron | |
| 5,728,458 A | 3/1998 | Sweeney | |
| 5,817,230 A * | 10/1998 | Groppo et al. ............. | 209/166 |
| 5,820,668 A | 10/1998 | Comrie | |
| 5,853,475 A | 12/1998 | Liskowitz et al. | |
| 5,888,322 A | 3/1999 | Holland | |
| 5,891,374 A | 4/1999 | Shah et al. | |
| 5,900,053 A | 5/1999 | Brothers et al. | |
| 5,997,630 A | 12/1999 | Angelskar et al. | |
| 5,997,632 A | 12/1999 | Styron | |
| 6,008,275 A | 12/1999 | Moreau et al. | |
| 6,030,447 A | 2/2000 | Naji et al. | |
| 6,143,069 A | 11/2000 | Brothers et al. | |
| 6,204,214 B1 | 3/2001 | Singh et al. | |
| 6,325,853 B1 | 12/2001 | Hogan et al. ............... | 118/300 |
| 6,332,921 B1 | 12/2001 | Brothers et al. | |
| 6,346,146 B1 * | 2/2002 | Duselis et al. ............ | 106/713 |
| 6,375,853 B1 * | 4/2002 | Yoon ............... | 210/727 |
| 6,387,175 B1 | 5/2002 | Lynn et al. | |
| 6,482,258 B2 | 11/2002 | Styron | |
| 6,485,561 B1 | 11/2002 | Dattel | |
| 6,506,248 B1 * | 1/2003 | Duselis et al. ............ | 106/713 |
| 6,533,848 B1 | 3/2003 | Robl et al. ............ | 106/DIG. 1 |
| 6,572,697 B2 * | 6/2003 | Gleeson et al. ............ | 106/705 |
| 6,641,658 B1 | 11/2003 | Dubey | |
| 6,645,289 B2 | 11/2003 | Soboley et al. | |
| 6,660,077 B2 | 12/2003 | De Buen-Unna et al. | |
| 6,676,744 B2 | 1/2004 | Merkley et al. ............ | 106/674 |
| 6,676,745 B2 | 1/2004 | Merkley et al. | |
| 6,682,595 B1 | 1/2004 | Barbour | |
| 6,692,564 B2 | 2/2004 | Hofmann | |
| 6,777,103 B2 | 8/2004 | Merkley et al. ............ | 428/532 |
| 6,824,605 B2 | 11/2004 | DeBuen Unna et al. | |
| 6,872,246 B2 | 3/2005 | Merkley et al. ............ | 106/805 |
| 2004/0083677 A1 | 5/2004 | Bezubic, Jr. | |
| 2004/0145078 A1 | 7/2004 | Merkley et al. | |
| 2004/0168615 A1 | 9/2004 | Luo | |
| 2004/0211342 A1 | 10/2004 | Sprouts et al. | |
| 2005/0005821 A1 | 1/2005 | Colombet et al. | |
| 2005/0016423 A1 | 1/2005 | Merkley | |
| 2005/0126430 A1 | 6/2005 | Lightner | |
| 2005/0235883 A1 | 10/2005 | Merkley | |
| 2007/0077436 A1 | 4/2007 | Naji et al. | |

FOREIGN PATENT DOCUMENTS

| | | |
|---|---|---|
| AR | 206890 | 8/1976 |
| AR | 227376 | 10/1982 |
| AR | 228671 | 3/1983 |
| AU | 515151 | 3/1981 |
| AU | 44948/85 | 6/1986 |
| AU | 0552930 B2 | 6/1986 |
| AU | A/55929/86 | 10/1986 |
| AU | 572111 | 5/1988 |
| AU | 606344 | 4/1989 |
| AU | A 13067/92 | 9/1992 |
| AU | 659400 | 11/1995 |
| AU | 199856266 B2 | 3/1999 |
| CN | 1099089 A | 2/1995 |
| CN | 1061328 | 3/1997 |
| CN | 1160070 | 9/1997 |
| CN | 1500038 A | 9/1997 |
| CN | 1178202 | 4/1998 |
| CN | 1251358 | 4/2000 |
| CS | 222361 | 8/1985 |
| CZ | 283459 | 4/1998 |
| DE | 2344773 | 3/1975 |
| DE | 143936 | 9/1980 |
| DE | 3324671 A1 | 1/1985 |
| DE | 3711549 A1 | 10/1987 |
| DE | 3743467 A1 | 7/1989 |
| DE | 37434671 A1 | 7/1989 |
| DE | 4229572 A1 | 3/1993 |
| DE | 19607081 | 8/1997 |
| EP | 0007585 | 8/1981 |
| EP | 0069095 | 1/1983 |
| EP | 0314242 | 10/1988 |
| EP | 0327351 | 8/1989 |
| EP | 0328431 | 8/1989 |
| EP | 0376334 | 7/1990 |
| EP | 619227 B1 | 10/1994 |
| EP | 0725044 A1 | 8/1996 |
| EP | 0678488 | 9/1998 |
| EP | 0846668 B1 | 3/2002 |
| EP | 0846666 B1 | 8/2004 |
| FR | 2512440 | 3/1983 |
| GB | 1265471 | 3/1972 |
| GB | 1490711 | 11/1977 |
| GB | 1514239 | 6/1978 |
| GB | 2106527 A | 4/1983 |
| GB | 2230772 | 10/1990 |
| GB | 2276875 * | 10/1994 |
| HU | 164419 B | 2/1974 |
| HU | 173947 B | 9/1979 |
| HU | 180773 B | 4/1983 |
| HU | 31027 * | 4/1984 |
| HU | 200511 B | 6/1990 |
| HU | 209836 B | 6/1994 |
| HU | 0001904 | 11/2000 |
| IT | 1311962 | 3/2002 |

| | | |
|---|---|---|
| JP | 75095319 | 12/1973 |
| JP | 54-25927 | 2/1979 |
| JP | 55095654 | 7/1980 |
| JP | 55130847 | 10/1980 |
| JP | 92-17659 | 2/1981 |
| JP | 56014466 | 2/1981 |
| JP | 57017452 | 1/1982 |
| JP | 59045953 | 9/1982 |
| JP | 57183344 | 11/1982 |
| JP | 58000351 | 1/1983 |
| JP | 58149939 | 9/1983 |
| JP | 59217659 | 12/1984 |
| JP | 60135211 | 7/1985 |
| JP | 60-191074 | 9/1985 |
| JP | 88-052740 | 6/1986 |
| JP | 61141656 | 6/1986 |
| JP | 61178462 | 8/1986 |
| JP | 62036055 | 2/1987 |
| JP | 62036056 B4 | 8/1987 |
| JP | 62207751 | 9/1987 |
| JP | 62235274 | 10/1987 |
| JP | 63248751 | 10/1988 |
| JP | 64-29843 | 1/1989 |
| JP | 92-052746 | 4/1990 |
| JP | 92-054171 | 4/1990 |
| JP | 02283646 A | 11/1990 |
| JP | 02289456 A2 | 11/1990 |
| JP | 03295843 A | 12/1991 |
| JP | 04002642 A | 1/1992 |
| JP | 04089340 | 3/1992 |
| JP | 04144949 A2 | 5/1992 |
| JP | 4182333 | 6/1992 |
| JP | 04349155 | 12/1992 |
| JP | 5-154816 | 6/1993 |
| JP | 5186261 | 7/1993 |
| JP | 06-127992 A | 5/1994 |
| JP | 06-144912 A2 | 5/1994 |
| JP | 62-71371 | 9/1994 |
| JP | 06256053 | 9/1994 |
| JP | 06258053 | 9/1994 |
| JP | 07165455 | 6/1995 |
| JP | 07187734 | 7/1995 |
| JP | 08073283 A | 3/1996 |
| JP | 09052747 A | 2/1997 |
| JP | 9201561 | 8/1997 |
| JP | 09227200 | 9/1997 |
| JP | 11139859 | 5/1999 |
| JP | 2000-302522 | 10/2000 |
| JP | 2002053361 | 2/2002 |
| KR | 9508587 | 8/1995 |
| RU | 2157796 | 10/2000 |
| RU | 2161695 | 1/2001 |
| RU | 2168485 | 6/2001 |
| SU | 411054 | 1/1974 |
| SU | 1571024 | 6/1990 |
| SU | 2243189 | 9/1990 |
| TW | 408089 | 10/2000 |
| WO | WO 86/00291 | 1/1986 |
| WO | WO 92/00251 | 1/1992 |
| WO | WO 96/40598 | 12/1996 |
| WO | WO 97/21640 | 6/1997 |
| WO | WO 97/27152 | 7/1997 |
| WO | WO 99/08885 | 2/1999 |
| WO | WO 00/48960 | 8/2000 |
| WO | WO 0151427 | 7/2001 |
| WO | WO 02/070218 A1 | 9/2002 |
| WO | WO 02/070247 A1 | 9/2002 |

OTHER PUBLICATIONS

"Optimization technique for sewage sludge conditioning with polymer and skeleton builders", Benitez et al., Water Research (1994), 28(10), 2067-73. (abstract only).*
"Quality and possible use of brown coal fly ash of East Germany" Blankenburg et al., Frieberger Forschungshefter C (1986), C 413, 102-14.□□*
Sevcik V., *Mixture for Refractory Purposes* (1997) 1 pg. XP 002389199.
Office Action mailed Jun. 5, 2006 for U.S. Appl. No. 10/090,561.
Office Action mailed Mar. 18, 2004 for U.S. Appl. No. 10/090,375.
Office mailed Oct. 21, 2003 for U.S. Appl. No. 10/090,560.
Office Action mailed Jun. 20, 2003 for U.S. Appl. No. 10/090,387.
Office Action mailed Sep. 24, 2003 for U.S. Appl. No. 10/090,406.
Office Action mailed Jan. 17, 2007 for U.S. Appl. No. 11/128,778.
Office Action mailed Feb. 26, 2004 for U.S. Appl. No. 10/090,385.
Office Action mailed Mar. 9, 2004 for U.S. Appl. No. 10/090,362.
Office Action mailed Mar. 9, 2004 for U.S. Appl. No. 10/090,338.
Office Action mailed Apr. 6, 2004 for U.S. Appl. No. 10/090,334.
Office Action mailed Feb. 22, 2007 for U.S. Appl. No. 10/960,150.
"Hydrated Calcium Silicate Products Other Than Hydraulic Cements," The Chemistry of Cements, edited by H.F.W. Taylor, vol. 2, p. 101-133, Academic Press, 1965.
"Autoclaved Lime-Quartz Materials," J.M. Crennan et al., Cement and Concrete Research, vol. 7, pp. 493-502, 1977.
"Autoclaved Calcium Silicate Hydrates, I—Rates of Formation and Molar Composition," S.A. Abo-El-Enein et al., II Cemento Mar. 1990.
"Influence on Quartz particle size on the Chemical & Mechanical Properties of Autoclaved Aerated Concrete," Isu et al., Cement & Concrete R., vol. 25, p. 243, 1995.
"Crystal Shape and Size Controls of Xonolite," Y. Arai et al., Gypsum and Lime, No. 248, p. 17, 1994.
CRC Handbook of Chemistry & Physics, $62^{nd}$ ed., p. F124, 1981-1982.
Aiken, A. & Taylor, H.F.W., "Hydrothermal Reactions in Lime-Quartz Pastes", J. Appl Chem., 10 , 1960, pp. 7-15.
Assarsson, G.O., "Hydrothermal Reactions Between Calcium Hydroxide and Muscovite and Feldspar at 120-220°," J. Phys. Chem., 64, 1060.
Chan, C.F. et al., "Formation of 11 Å Tobermorite from Mixtures of Lime and Colloidal Silica with Quartz", Cement and Concrete Research, 1978, pp. 135-138.
Kondo, R., "Kinetic Study on Hydrothermal Reaction Between Lime and Silica," Autoclaves Calcium Silicate Building Products, London, 1965, 92, 1967.
Kondo, R., et al., "Kinetics and Mechanism of Hydrothermal Reaction in Lime-Quartz-Water System," J. Ceram. Soc., Japan, 84, 1976.
Skaggs et al., "Applications of rheological modifiers . . . ", Am. Concrete Institute, 1994, pp. 148, 189-207.
Celite Material Safety Data Sheet, Revised date Jul. 10, 1992, 1 p.
Kennedy, GC, Fig 1945 from Econ. Geol. 1950, 45(7)652.
Xu, Lingling, et al., "Study on particle size distribution and chemical activity of mechanical activated fly ash," Guisuanyan Tongbao, 2003, 22(s), pp. 73-76.
"Self-leveling elastic waterproofing coating," Shanghai Building Materials, Issue 6, 2000, pp. 1-5.

* cited by examiner

COATINGS FOR BUILDING PRODUCTS AND DEWATERING AID FOR USE WITH SAME

PRIORITY CLAIM

This application claims priority from the following Australian provisional patent applications, the full contents of which are hereby incorporated by cross-reference.

| Application No | Title | Date Filed |
| --- | --- | --- |
| PR3474 | A Composite Product | 2 Mar. 2001 |
| PR3475 | Spattering Apparatus | 2 Mar. 2001 |
| PR3476 | Additive for a Dewaterable Slurry | 2 Mar. 2001 |
| PR3477 | A Method and Apparatus for Forming a Laminated Sheet Material by Spattering | 2 Mar. 2001 |
| PR3478 | Coatings for Building Products | 2 Mar. 2001 |

BACKGROUND OF THE INVENTION

1. Field of the Invention

The present invention relates to coatings and in particular coatings for building products and laminated building products.

2. Description of the Related Art

Any discussion of the prior art throughout the specification should in no way be considered as an admission that such prior art is widely known or forms part of common general knowledge in the field.

There are a huge variety of mechanisms for applying coatings to building products such as building boards.

The coatings can be divided into two main groups namely finishing coatings, which are intended primarily for aesthetic purposes, and functional coatings which provide some additional structural or other property/attribute to the resultant product.

The application technique depends to a large extent on the properties of the coating composition and base layer or product to be coated. Manual application and spraying etc are most popular but they restrict the types of coating to be applied and indeed the building product to be coated. For example, when using a spray technique, one must ensure the coating composition is of sufficient flowability to pass through the spray nozzle but at the same time, the base material to be coated must be sufficiently rigid to withstand the impact of the spray coating.

For certain building products, such as internal wall systems, a smooth surface finish is vital. Gypsum or plaster board is used almost exclusively as an internal wall board due to its excellent surface finish.

The use of fibre reinforced cement building board for instance as an internal wall board has significant advantages including cost and structural integrity as compared with gypsum board. However, some techniques for production of fibre reinforced cement sheets do not provide a gypsum like surface finish. In response to public demand, builders require an internal wall board with a near perfect surface finish. Even minute irregularities which arise from production of fibre reinforced cement sheets can be sufficient to reject the product. Sanding the surface of the FRC sheet has been used to improve its surface finish but in some instances such sanding can 'feather' or leave exposed the reinforcing fibres thereby exacerbating the problem.

It is an object of the present invention to overcome or ameliorate at least one of the disadvantages of the prior art, or to provide a useful alternative.

SUMMARY OF THE INVENTION

In a first aspect, the present invention provides a method for coating a building product comprising providing a coating formulation including a hydraulic binder and a quantity of dewatering agent, producing a slurry of said formulation, applying said slurry to the product to be coated and dewatering said slurry through said product.

In a second aspect, the present invention provides a formulation for use in coating a building product comprising a hydraulic binder and a quantity of dewatering agent sufficient to permit dewatering of a slurry produced from said formulation through the building product.

In a third aspect, the present invention provides a dewaterable slurry for coating a building product, said slurry comprising water, a hydraulic binder and a quantity of dewatering agent sufficient to permit dewatering of said slurry through said building product.

In a fourth aspect, the present invention provides a composite product comprising a base structural layer with a coating thereon, the coating including a hydraulic binder and a quantity of dewatering agent sufficient such that the coating may be dewatered through the base layer.

In a fifth aspect, the present invention provides a method of making and improving a hydraulic binder based coating formulation for coating a building product comprising adding to said binder a quantity of dewatering agent such that after application of a slurry of said formulation to said building product, said slurry can be dewatered through the building product.

In a sixth aspect, the present invention provides a dewatering aid for dewatering a cementitious slurry coating on a product, said dewatering aid comprising a quantity of particulate material sufficient to permit dewatering of the slurry through the product to be coated.

DETAILED DESCRIPTION OF THE PREFERRED EMBODIMENTS

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The dewatering agent serves to maintain sufficient porosity in the slurry and product to be coated to permit dewatering of the slurry through the product to be coated. Preferably, the dewatering agent is a particulate material such as fly ash, alumina trihydrate, silica flour, cenospheres (ceramic hollow spheres) or similar.

Fly ash is particularly preferred as it permits dewatering of the slurry within a few minutes. Other particulate dewatering agents such as alumina trihydrate or silica flour may also be used, however, they increase the time required for dewatering of the slurry through the product to be coated.

In a preferred embodiment, the slurry applied to the product to be coated has a high water content. Preferably, the water content can be up to 50%. This is in contrast to previous cementitious formulations which generally have a higher solids content.

By combining the various components of the coating formulation described above, a dewaterable slurry is obtained which can be applied to the building product, dewatered through the building product and thereby provide a uniform coating over the building product.

Normally, after application of the coating, the resultant product would be normally cured, steam cured or hydrothermally cured, ie autoclaved, and if required, sanded to a smooth flat finish.

The building product to which the coating can be applied is virtually limitless provided the slurry can be dewatered through the building product. Cementitious and gypsum building boards are typical examples of suitable building products on which the coating can be applied.

The resultant coating, which may optionally contain fibres, results in a decorative finishing layer which is sandable, smooth, flat, low permeable, crack free and/or flexible, ready to be finished, for example by painting.

The thickness of such a coating layer prior to sanding would range from around 0.1 to 10 mm, preferably about 0.5 to 5 mm and most preferably about 1 to 3 mm.

After sanding, the finish layer may have a depth of around 0.05 to 5 mm, preferably about 0.1 to 2 mm and most preferably about 0.5 to 1 mm. The thus produced coated product is comparable in its workability to monolithic (single layer) composites. It can be flexed, cut, drilled and fixed by nails etc to a frame without surface cracking or chipping.

The applicants have found an extremely good interlaminer bond and compatibility between the dewatered slurry layer and base layer resulting in excellent composite action, compatibility and resistance to delamination.

The term 'hydraulic binder' as used throughout the specification refers to a pulverised material in the solid, dry state which, when mixed with water, yields plastic mixtures that are able to set and harden, for example a cement. Included within the definition are white, grey or pigmented cements and hydraulic limes.

The term 'cement' includes hydraulic and alite cements such as portland cement, blended cements such as portland cement blended with fly ash, blast-furnace slag, pozzalans and the like and mixtures thereof, masonry cement, oil well cement, natural cement, alumina cement, expansive cements and the like, or mixtures thereof.

The quantity of binder in the formulation is preferably between about 10 to 50 wt % based on the total dry ingredients, more preferably about 15 to 40 wt % and most preferably about 20 to 30 wt %.

The fly ash used in the present invention provides a number of advantages including, particularly, as an aid to dewatering of the slurry as defined above.

The term 'fly ash' as used herein refers to a solid powder having a chemical composition similar to or the same as the composition of material that is produced during combustion of powdered coal, ie about 25 to 60 wt % silica, about 10 to 30 wt % $Al_2O_3$, about 5 to 25 wt % $Fe_2O_3$, about 0 to 20 wt % CaO and about 0 to 5 wt % MgO.

Fly ash particles are typically spherical and range in diameter from about 1 to 100 microns. In a preferred embodiment, the fly ash comprises two components. A first 'larger' size particles of fly ash with preferably about a 100 micron maximum size. This size range of fly ash is used in the slurry to aid in improving the dewatering characteristics of the slurry but also as a moderately reactive pozzolan.

The second 'smaller' fly ash size zone which preferably has about a 10 micron maximum size also adds an improving dewatering characteristic but is a more highly reactive pozzolan. This 'smaller' fly ash particle zone also improves the sanded surface quality of the finish layer.

In a preferred embodiment, the first fly ash comprises about 10 to 60 wt % of the formulation based on total dry ingredients, more preferably about 20 to 50 wt % and most preferably about 30 to 40 wt %.

The second fly ash component preferably provides about 5 to 30 wt % of the formulation based on total dry ingredients, more preferably about 10 to 25 wt % and most preferably about 15 to 20%.

In another preferred embodiment, the dewatering agent may include a coarse fraction fly ash which is greater than about 100 microns. This coarse fraction fly ash includes bottom ash or similar products from coal combustion. There is an advantage to using these products over the aforementioned particle size fly ash since it is cheaper. Of course, as will be clear to persons skilled in the art, some reformulation of the slurry may be required to provide a suitable coating and appropriate dewatering characteristics when the dewatering agent is such a coarse fraction fly ash.

The coating may optionally contain other additives such as fillers. Such fillers may also be used to improve the dewatering characteristics of the slurry. For example, cenospheres (hollow ceramic microspheres) diatomite, wollastonite, ground rice hulls, ground perlite or the like, are particularly suitable for this purpose.

These and other fillers may also be used to provide additional benefits, for example calcium carbonates or alumina hydrates improve sandability and flexibility of the coated layer respectively. Silica flour improves hardness of the sanded surface of the coating layer and the acoustic/thermal insulation properties of the layer can be improved by including rubber particles, vermiculite, perlite, expanded polystyrene or gypsum.

The fillers preferably comprise about 5 to 30 wt % of the formulation based on total dry ingredients, more preferably about 10 to 25 wt % and most preferably about 25 to 20 wt %.

The coating may also contain other organic additives. Cement plasticising agents, for example, may be used to alter the rheology of the slurry. Suitable cement plasticising agents include melamine sulphonate formaldehyde condensates, naphthalene sulphonate formaldehyde condensates, naphthalene sulphonates, calcium lignosulphonates, sodium lignosulphonates, saccharose, sodium gluconate, sulphonic acids, carbohydrates, amino carboxylic acids, polyhydroxycarboxilic acids, sulphonated melomine and the like.

The amount of cement plasticiser of course will depend upon the fluidising ability of the particular plasticisers. Generally the quantity of plasticiser will be in the range of about 0.3 to 3 wt % and more preferably about 0.5 to 2 wt % based on the total of dry ingredients in the formulation.

Particularly preferred cement plasticisers are Melment F-10, a melamine formaldehyde sodium bisulphate polymer dispersant marketed by SKW-Trostburg in the form of a fine white powder. Another suitable plasticiser is Neosyn, a condensed sodium salt of sulphonated naphthalene formaldehyde available from Hodgson Chemicals.

Another preferred component in the coating is a biopolymer which acts to enhance the flowability, segregation resistance and self levelling qualities of the cementitious slurry. Particularly suitable bioplymers are xanathan gum and/or whelan gum, eg KELCO-CRETE, K1C 376 manufactured by Monsanto.

Latex may also be included in the coating composition to improve adherence, elasticity, stability and impermeability of the coating. The latex also improves flexibility of the formed coating.

The latex may be selected from the group consisting of acrylic latex, styrene latex, butadiene latex or mixtures thereof and is provided preferably in an amount between about 0.5 to 20%, more preferably about 1 to 15% and most preferably about 10% by weight of cement (on polymer solids basis) solids.

Vinyl polymers may also be incorporated into the coating either in addition or as a substitute to the latex emulsions. Such vinyl polymers or equivalent polymeric materials enhance adhesion, resilience and flexural strength and abrasion resistance of the coating.

Preferred vinyl polymers include polyvinyl acetate or a copolymer vinyl acetate with another monomer such as ethylene. A particularly preferred vinyl acetate resin is VINNAPAS LL5044 thermo plastic resin powder which contains a vinyl acetate-ethylene copolymer available from Wacker. Such powdered vinyl polymer is preferably provided in quantities similar to the latex emulsion referred to above.

In addition to the above, conventional other additives such as mineral oxides, hydroxides and clays, metal oxides and hydroxides, fire retardants such as magnesite, thickeners, silica fume or amorphous silica, water sealing agents, water reducing agents, setting modifiers, hardeners, dispersants, foaming agents or flocculating agents, water-proofing agents and density modifiers are suitable for use with the present invention.

In this regard, one particular advantage arising from the present invention is the ability to treat the product to be coated by providing additives in the coating. To explain, since the coating is dewatered through the product to be coated, it is possible to provide additives to the base layer by incorporation in the slurry. For instance, a waterproofing agent such as silane may be included in the coating in excess of the coating layers requirements. During dewatering, the silane will be drawn into and through the base layer being coated thereby treating the base layer. This simultaneous treatment of the base layer as well as coating the base layer is a valuable additional benefit arising from the aforedescribed method.

EXAMPLES

The preferred embodiments of the present invention will now be described by way of example only with reference to the following embodiments.

In each of the following examples, the product was produced as follows.

Step 1 Slurry Preparation

A slurry of the formulation is prepared by mixing the hydraulic binder, fly ash and other optional components with water. The solids content in the slurry is preferably between about 50 and 90%, more preferably about 55 to 80% and most preferably about 60 to 70%.

Step 2 Slurry Application/Dewatering

The slurry is applied to the base layer by any convenient means such as brushes rollers, knives or sprays etc. In a particular embodiment the slurry is applied by means of the apparatus and method subject of Australian Provisional Patent Application Nos. PR3475 and PR3477, which are incorporated herein by reference.

The slurry is preferably designed to self level and form a uniform coating on the product. The building product to be coated exhibits s certain degree of porosity causing the slurry to dewater and form a uniform deposited cementitious layer. Time for dewatering can vary quite dramatically but normally occurs between about 10 and 90 seconds, depending on the porosity of the material to be coated, its water content and thickness and viscosity of the slurry formulation. A vacuum may be used to reduce the slurry dewatering time if required.

This is particularly useful when tailoring the coating process to the speed of a building product forming process, eg between about 40 to 45 seconds on a Hatschek production line.

Step 3 Curing

After forming, the green laminate article comprising the building product plus coating is preferably precured for a short time, eg up to about 48 hours, then cured by air/moist curing at room temperature, steam curing between about 40 and 90° C. or autoclaving in a steam pressure vessel between about 120 and 200° C.

For either of these three curing techniques, a curing time range between about 6 and 72 hours, preferably up to about 48 hours, is suitable. Of course, as will be clear to persons skilled in the art, the length of time chosen for curing is dependent on the formulation, the manufacturing process and form of the article.

The following examples relate to specific formulation compositions.

Example 1

Sandable Dewatered Slurry Composition

Function: sandable, durable finishing layer for facade applications.

The low viscosity slurry (drainage time in 50 ml volume funnel=3.4 seconds) was applied on the base layer (Hardiform™ 12 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Silica Flour (400 G grade) | 10 | 4000 |
| Fly ash (larger size fraction) | 40 | 16000 |
| Fly ash (smaller size fraction) | 20 | 8000 |
| Total | 100 | 40000 |
| Water (W) | | 14000 |
| Water/Solids (W/S ratio) | 0.35 | |
| Solids Content (W/W + S) | 0.74 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 2

Rubberised Dewatered Slurry Composition

Function: Finishing layer in skid-resistant flooring, hard wearing static dissipative flooring and acoustic insulating ceiling panels.

The low viscosity slurry (drainage time in 50 ml volume funnel=4.2 seconds) was applied on the base layer (Hardiform™ 12 mm thick cellulose fibre reinforced cement-based green sheet manufactured by James Hardie Industries). The slurry dewatered in 60 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Recycled Rubber crumbs (minus 30 mesh) | 10 | 4000 |
| Fly ash (larger size fraction) | 40 | 16000 |
| Fly ash (smaller size fraction) | 20 | 8000 |
| Total | 100 | 40000 |
| Water | | 13000 |
| Water/Solids (W/S ratio) | 0.325 | |
| Solids Content (W/W + S) | 0.755 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 3

Flexible & Sandable Dewatered Slurry Composition

Function: Flexible & sandable finishing layer on thin fibre cement reinforced cement-based lining.

The low viscosity slurry (drainage time in 50 ml volume funnel=2.8 seconds) was applied on the base layer (Hardiflex™ 4.5 mm thick cellulose fibre reinforced cement-based green sheet manufactured by James Hardie Industries). The slurry dewatered in 120 seconds (un-aided by vacuum) forming a 1.25 mm thick coating. The coated sheet was precured for 48 hours then was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 20 | 8000 |
| Calcium Carbonate Grade 10 (40 um avg. size) | 10 | 4000 |
| Alumina Tri-hydrate (80 um avg. size) | 5 | 2000 |
| Fly ash (larger size fraction) | 45 | 18000 |
| Fly ash (smaller size fraction) | 20 | 8000 |
| Total | 100 | 40000 |
| Water | | 12000 |
| Water/Solids (W/S ratio) | 0.30 | |
| Solids Content (W/W + S) | 0.77 | |
| Organic Additive | | |
| Welan Gum (Kelcocrete) | 0.0075 | 3.0 |
| naphthalene formaldehyde Plasticising Agent (Neosyn) | 0.25 | 100.0 |
| Styrene Acrylic Latex Emulsion (56% solids) | 5 | 2000 |

Example 4

Flexible & Sandable Dewatered Slurry Composition (Low Cement)

Function: Flexible & sandable finishing layer on thin fibre cement reinforced cement-based lining.

The low viscosity slurry (drainage time in 50 ml volume funnel–4.5 seconds) was applied on the base layer (Hardiflex™ 4.5 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 10 | 4000 |
| Calcium Carbonate Grade 10 (40 um avg. size) | 20 | 8000 |
| Alumina Tri-hydrate (80 um avg. size) | 5 | 2000 |
| Fly ash (larger size fraction) | 40 | 18000 |
| Fly ash (smaller size fraction) | 25 | 10000 |
| Total | 100 | 40000 |
| Water | | 116000 |

-continued

| Slurry Composition | % by total weight of solids (S) | Weight in gm |
|---|---|---|
| Water/Solids (W/S ratio) | 0.40 | |
| Solids Content (W/W + S) | 0.715 | |
| Organic Additives | | |
| Welan Gum (Kelcocrete) | 0.0075 | 3.0 |
| naphthalene formaldehyde Plasticising Agent (Neosyn) | 0.25 | 100.0 |
| Vinyl acetate-ethylene powdered copolymer (Vinnapas LL5004) | 1.625 | 650 |

The aforementioned examples provide a coated product comparable in workability to monolithic or single layer composites. They can be flexed, cut, drilled or fixed by nails or the like to a frame without surface cracking or chipping.

The surface is 'finish-ready' and remains smooth, flat, crack-free and with low permeability even when used in a curved configuration.

Each examples provided excellent interlaminer bond between the base sheet and coating exhibiting good composite action, compatibility and resistance to delamination.

It can be seen that the present process provides a significant improvement not only in the attributes of the product but also in the ability to tailor the surface finish of a building product to match particular requirements. Examples of particular formulations to provide the desired finish characteristic include a) Terrazzo (hardwearing decorative finish)—the finishing layer of the dewatered slurry can contain marble chips and pigmented cements and fillers. It may then be sanded and polished to form a hardwearing decorative finish. Such a coating on, for example, a fibre cement backing board, could be used as flooring tiles, decorative wall lining or external prefinished fibre cement cladding.

b) Stucco (orange peel) Finish—this may be achieved by manipulating speed and volume of the applied slurry to achieve a stucco look on the finishing layer. Once again, such a product may be used as an external pre-finished cement cladding.

c) Sandable finish—this is probably the simplest and most straightforward application of the coating technique to provide a coating layer which may be sanded and sealed, thereby providing a paint ready smooth, crack-free and low permeable surface. Such a product may be used for a variety of internal and external uses.

d) Flexible finish—the coating layer may include various fillers and other additives to improve its flexibility, eg ethylene vinyl acetate, styrene butadiene rubber, styrene acrylic. It is designed to be a sandable, workable ie by score and snap, nailable, crack-free, non-chipping, flexible and bendable, paint ready surface. Such a coating could normally be applied to reasonably thin building product to permit flexibility. It has a wide variety of uses but is particularly suitable as an internal lining in wet area applications or as an external cladding element, eg as a paint ready fibre cement siding.

e) Skim-coated finish—such a coating of the dewatered slurry may be applied to gypsum based building products thereby providing a smooth, flat, pre-skim coated and paint ready surface.

f) Rubberised finish—by the addition of rubber crumbs into the slurry formulation, a coating layer may be provided on say a fibre cement backing for use as a skid resistant flooring, hardwearing static dissipative flooring or acoustic insulating ceiling panels.

It will be understood by persons skilled in the art that the present invention may be embodied in other forms without departing form the spirit or scope of the inventive idea as described herein. In particular, it will be appreciated that the formulations, coatings, additives, methods and composite products of the present invention are suitable or may be adapted for use in conjunction with the methods and apparatus as described in the various priority documents.

What is claimed is:

1. A dewatering aid for dewatering a cementitious slurry coating on a product, said dewatering aid comprising a particulate material in an effective quantity and particle size to maintain porosity in the slurry and the product to be coated during dewatering and thereby permit dewatering of the slurry through the product to be coated, wherein said dewatering aid is fly ash particles having two components with a first larger size component of particles of about a 100 micron maximum size in an amount of about 10 to 60 wt % of the cementitious slurry based on total dry ingredients, and a second smaller size component of particles of about a 10 micron maximum size in an amount of about 5 to 30 wt. % of the cementitious slurry based on total dry ingredients.

2. The dewatering aid according to claim 1, wherein the slurry includes additives as fillers selected from the group consisting of ceramic hollow spheres, diatomite, wollastonite, ground rice hulls, perlite, vermiculite, expanded polystyrene, gypsum, calcium carbonate, alumina hydrate, and silica flour.

3. The dewatering aid according to claim 1, wherein the product through which the slurry is dewatered is a cementitious building board or product or gypsum building board.

4. The dewatering aid according to claim 1, wherein the slurry includes fibres.

5. The dewatering aid according to claim 1, wherein the coating includes an hydraulic binder selected from the group consisting of white, grey or pigmented cements, hydraulic limes and mixtures thereof.

6. The dewatering aid according to claim 1, wherein the coating includes cements selected from the group consisting of Portland cement, blended cements, blast furnace slag, pozzolans, masonry cement, oil well cement, natural cement, alumina cement, expansive cements and mixtures thereof.

7. The dewatering aid according to claim 1, wherein the slurry includes a binder between about 10 and 50 wt % based on total dry ingredients.

8. The dewatering aid according to claim 1, wherein the slurry includes organic additives selected from the group consisting of plasticising agents and biopolymers.

9. The dewatering aid according to claim 1, wherein the dewatering aid allows the coating to be uniform on the product.

10. The dewatering aid according to claim 1, wherein the dewatering aid permits dewatering of the slurry within a few minutes.

11. The dewatering aid according to claim 1, wherein the cementitious slurry coating includes additives to improve resultant properties of the coating.

12. The dewatering aid according to claim 1, wherein the cementitious slurry coating includes additives to improve workability and applicability of the slurry to the product to be coated.

13. The dewatering aid according to claim 1, wherein the cementitious slurry coating includes additives to improve the properties of the product to be coated such that upon dewatering of the slurry through the product, the product is thus treated with said additive.

14. A dewatering aid for dewatering a cementitious slurry coating on a product, said dewatering aid comprising a particulate material in an effective quantity and particle size to maintain porosity in the slurry and the product to be coated during dewatering and thereby permit dewatering of the slurry through the product to be coated, wherein said dewatering aid comprises about 25-60 wt % silica, about 10-30 wt % $Al_2O_3$, about 5-25 wt % $Fe_2O_3$, about 0-20 wt % CaO, about 0-5 wt % MgO, wherein a first portion of the particulate material has a larger particle size of about a 100 micron maximum size in the amount of about 10 to 60 wt % of the cementitious slurry based on total dry ingredients and a second portion of the particulate material that is a smaller particle size of about a 10 micron maximum size in the amount of 5 to 30 wt. % of the formulation based on total dry ingredients, and wherein the slurry is up to 50% water, wherein the water is based on percent by total weight of solids.

15. The dewatering aid according to claim 14, wherein the dewatering aid is fly ash.

16. The dewatering aid according to claim 14, wherein the product through which the slurry is dewatered is a cementitious building board or product or gypsum building board.

17. The dewatering aid according to claim 14, wherein the dewatering aid permits dewatering of the slurry within a few minutes.

18. The dewatering aid according to claim 14, wherein the particulate material includes a particle size greater than about 100 microns and wherein the particles of size greater than about 100 microns is selected from the group consisting of fly ash, and bottom ash.

19. The dewatering aid according to claim 14, wherein the slurry includes additives as fillers selected from the group consisting of ceramic hollow spheres, diatomite, wollastonite, ground rice hulls, perlite, vermiculite, expanded polystyrene, gypsum, calcium carbonate, alumina hydrate, and silica flour, and wherein the additives may be further selected from the group consisting of organic additives of plasticising agents and biopolymers.

* * * * *